United States Patent Office 3,720,706
Patented Mar. 13, 1973

3,720,706
METHYLENE AND OXYMETHYLENE BIS-ESTER PRODUCTION
Seymour J. Lapporte, Orinda, and William G. Toland, San Rafael, Calif., assignors to Chevron Research Company, San Francisco, Calif.
No Drawing. Filed Jan. 27, 1972, Ser. No. 221,415
Int. Cl. C07c 67/04
U.S. Cl. 260—494     12 Claims

ABSTRACT OF THE DISCLOSURE

Methylene and oxymethylene di- or bis-esters, e.g.,

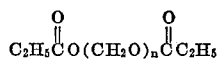
$$C_2H_5\overset{O}{\underset{\|}{C}}O(CH_2O)_n\overset{O}{\underset{\|}{C}}C_2H_5$$

wherein $n$ is 1 to 5, are produced by the reaction of a carboxylic acid, an olefin, carbon monoxide and formaldehyde in the presence of a rhodium catalyst and an iodide promoter. In a preferred modification of the process, methylene and oxymethylene bis-alkanoates are produced directly from an alkene, carbon monoxide, water and formaldehyde in the presence of the rhodium catalyst and the iodide promoter.

BACKGROUND OF THE INVENTION

Processes for the production of methylene and oxymethylene bis-esters are known in the art. For example, Tomiska and Spousta, Angew. Chem., Int. Ed., 1, 211 (1962) disclose the preparation of methylene and oxymethylene bis-acetates from acetic anhydride and trioxane in the presence of perchloric acid.

Methylene and oxymethylene bis-esters are useful for preserving moist grain during storage, as disclosed by French Pat. No. 70/37,979 of Kensler et al., granted July 12, 1971.

SUMMARY OF THE INVENTION

It has now been found that methylene and oxymethylene di- or bis-esters are produced by the reaction of (1) a carboxylic acid, (2) an olefin, (3) carbon monoxide and (4) formaldehyde in the presence of a catalyst system comprising a rhodium compound and an iodide promoter. By way of illustration, the reaction of propionic acid, ethylene, carbon monoxide and formaldehyde in the presence of rhodium dicarbonyl chloride dimer and ethyl iodide produces a good yield of methylene bis-propionate.

In some modifications of the process of the invention, an alkanoic acid reactant is generated in situ by the reaction of an alkene, water and carbon monoxide in the presence of the rhodium catalyst and iodide promoter so that the methylene and oxymethylene bis-alkanoates are produced directly from an alkene reactant, carbon monoxide, water and formaldehyde.

DESCRIPTION OF PREFERRED EMBODIMENTS

The catalyst system

The catalyst system employed in the process of the invention comprises a rhodium compound and an iodide promoter.

Suitable rhodium compounds include rhodium halides, such as $RhCl_3$, $RhBr_3$ and $RhI_3$; rhodium carbonyl halides, such as $Rh_2(CO)_4Br_2$, $Rh_2(CO)_4Cl_2$ and $Rh_2(CO)_4I_2$; and $Rh_2O_3$. Other suitable rhodium compounds are rhodium coordination compounds containing monodentate ligands, such as carbon monoxide, halides, amines, organophosphines, organoarsines and/or organostibines, i.e., rhodium compounds such as $Rh[(C_6H_5)_3P]_2(CO)I$ and $RhCl(CO)[(C_6H_5)_3As]_2$.

Suitable iodide promoters include iodine, hydrogen iodide and alkyl iodides of 1 to 6 carbon atoms and 1 to 3 iodide groups such as methyl iodide, ethyl iodide, methylene diiodide, iodoform, and isopropyl iodide.

Certain rhodium compounds such as $RhI[(C_6H_5)_3P]_3$ or $RhI_3$ incorporate iodide moieties so that a separate iodide promoter is not required.

Molar ratios of the iodide promoter to the rhodium component of the catalyst system in the range of 1:1 to 2500:1 are generally suitable. However, the preferred molar ratios of iodide promoter to rhodium component are about 3:1 to 300:1 and the most preferred molar ratios are about 5:1 to 100:1.

Concentrations of the rhodium compound of the catalyst system in the reaction medium between $10^{-6}$ moles/liter and $10^{-1}$ moles/liter, are normally employed, with the preferred range being $10^{-4}$ moles/liter and $10^{-2}$ moles/liter. Higher concentrations even to the extent of 1 mole/liter may, however, be used if desired.

The concentration of the iodide promoter portion of the catalyst system in the reaction medium may vary widely over the broad concentration range of $10^{-6}$ moles/liter to 18 moles/liter, based on iodide atom. In the process of this invention, however, the preferred concentration range of promoter is $10^{-4}$ moles/liter to 2 moles/liter.

Although the catalyst system is generally employed as a homogeneous catalyst system, the catalyst system may be dispersed on inert supports, such as silica or alumina, to provide a heterogeneous catalyst system.

The catalyst system of a rhodium compound and an iodide promoter is a known catalyst combination and is disclosed, for example, in U.S. 3,579,552 of Craddock et al., issued May 18, 1971. A variety of rhodium compounds and iodide promoters, as well as the preparation of the catalyst system, is disclosed in U.S. 3,579,552. The disclosure of U.S. 3,579,552 is hereby incorporated by reference.

In addition to the catalyst system of a rhodium compound and an iodide promoter, other Group VIII transition metal compounds such as ruthenium, palladium, iridium and platinum compounds in combination with an iodide promoter are also useful as catalyst systems for the process of the invention. Such catalyst systems are disclosed in U.S. 3,579,551, issued to Craddock et al. on May 18, 1971, and Canadian Pat. No. 837,640, issued to Paulik et al. on March 24, 1970.

The olefin reactant

The process of the invention is generally applicable to the reaction of any organic compound having at least one aliphatic, olefinically unsaturated carbon-carbon double bond, and generally from 2 to 60 carbon atoms, but preferably of from 2 to 30 carbon atoms. The olefin reactant is an acyclic, a monocyclic, bicyclic or polycyclic olefin and is a monoolefin, diolefin or polyolefin. The olefinic linkages of diolefins and polyolefins are either conjugated or nonconjugated. The olefin reactant preferably is hydrocarbon containing only atoms of carbon and hydrogen, but it can be a substituted-hydrocarbon additionally containing relatively stable and inert functional groups.

A preferred class of olefin reactants are hydrocarbon monoolefins of from 2 to 20 carbon atoms, preferably of from 2 to 9 carbon atoms, and represented by the Formula I $$R^1{}_2C=CR'_2 \qquad (I)$$

wherein $R'$ independently is hydrogen or alkyl of from 1 to 10 carbon atoms, preferably of from 1 to 6 carbon atoms, an alkaryl of from 6 to 10 carbon atoms, an aralkyl group of from 6 to 10 carbon atoms or phenyl, with the proviso that any two alkyl $R'$ groups can be joined to form a 4 to 9-membered, preferably 5 to 6-membered, carbocyclic ring.

Suitable aryl substituted monoolefins of Formula I having 1 to 2 aryl groups are styrene, 3-phenylpropene-1, 1,2-diphenylethylene and 3-tolylbutene-1.

Suitable alkenes of Formula I include ethylene, propylene, 1-butene, 2-butene, isobutylene, hexene-3, 3-methyl-1-octene, decene-1, cyclopentene, cyclohexene and methylenecyclohexane. Particularly preferred monolefins of Formula I are linear alkenes of 2 to 6 carbon atoms, especially linear terminal alkenes such as ethylene, propylene, 1-butene or 1-hexene.

The carboxylic acid reactant

The process of this invention is broadly applicable to any organic compound containing at least one carboxylic acid group. Suitable carboxylic acid reactants include carbocyclic aromatic carboxylic acids, such as benzoic acid, p-chlorobenzoic acid, terephthalic acid and naphthoic acid; heterocyclic carboxylic acids, such as picolinic acid, furoic acid and thiophenic acid; and aliphatic carboxylic acids, such as oleic acid, adipic acid, and cyclohexane carboxylic acid.

One class of preferred carboxylic acid reactants are hydrocarbon carboxylic acids represented by the Formula II $$RCO_2H \quad (II)$$

wherein R is an alkyl group of from 1 to 10 carbon atoms, preferably of from 1 to 6 carbon atoms, an alkaryl group of from 6 to 10 carbon atoms, an aralkyl group of from 6 to 10 carbon atoms or phenyl. Illustrative carboxylic acids of Formula II therefore include alkanoic acids, such as acetic acid, propionic acid, isobutyric acid, butyric acid, hexanoic acid, 4-methylheptanoic acid and decanoic acid, and aromatic acids such as benzoic acid, toluoic acid, phenylacetic acid, 2-phenylbutyric acid, 2,4-dimethylbenzoic acid and 3-tolylbutyric acid. Preferred carboxylic acids of Formula II are alkanoic acids, especially linear alkanoic acids of 2 to 4 carbon atoms, i.e., acetic acid, propionic acid and n-butyric acid.

An alkanoic acid reactant of Formula II is suitably provided to the reaction mixture as the preformed material or is generated in situ in the reaction mixture. A preferred method of generating an alkanoic acid reactant of from 3 to 10 carbon atoms is by reacting an alkene of 2 to 9 carbon atoms, carbon monoxide and water in the presence of the catalyst system of the invention. As disclosed in U.S. 3,579,552, cited above, alkanoic acids are formed by the reaction of an alkene, carbon monoxide and water in the presence of the catalyst system employed in the process of the invention.

In another modification of the reaction, the alkanoic acid reactant is suitably generated in situ by the reaction of an alkanol of 1 to 9 carbon atoms and carbon monoxide in the presence of the catalyst system employed in the process of the invention, as disclosed in Canadian Pat. No. 837,643 of Paulik et al., issued Mar. 24, 1970.

The formaldehyde reactant

The formaldehyde reactant is suitably introduced in the pure form or produced in situ, e.g., from paraformaldehyde or trioxane. In the modification of the process wherein water is employed as a reactant (wherein an alkanoic acid reactant is generated in situ from the olefin, carbon monoxide and water), the formaldehyde is suitably introduced as an aqueous solution.

The carbon monoxide reactant

The carbon monoxide is employed in the process at partial pressures of from about 1 p.s.i.a. to about 5000 p.s.i.a., although partial pressures of about 25 p.s.i.a. to 1000 p.s.i.a. are preferred. Carbon monoxide streams containing inert impurities such as carbon dioxide, hydrogen, methane, nitrogen and paraffinic hydrocarbons having 1 to 4 carbon atoms may be employed, if desired.

The methylene and oxymethylene ester products

The methylene and oxymethylene di- or bis-esters produced by the process of the invention are represented by the Formula III

wherein R and R' have the same significance as defined in Formulas I and II and $n$ is a whole integer from 1 to 5 inclusive, preferably 1 or 2.

In terms of the carboxylic acid reactant represented by Formula II, the formaldehyde reactant, carbon monoxide, the olefin reactant represented by Formula I, the overall net reaction involved in the process of the invention is depicted by the following Equation 1:

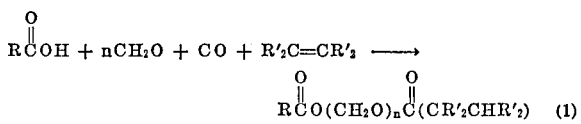

By way of illustration (1) the reaction of acetic acid, $CH_2O$, CO, and ethylene according to the process of the invention produces an acetate propionate diester of the formula

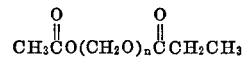

(2) the reaction of propionic acid, $CH_2O$, CO and ethylene produces propionate esters of the formula

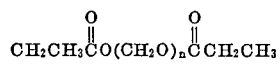

and (3) the reaction of benzoic acid, $CH_2O$, CO and 1-butene produces a mixture of benzoate-isobutyrate and benzoate-n-butyrate diesters of the formulas

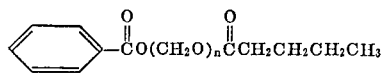

and

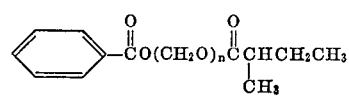

In the modification of the process wherein an alkanoic acid reactant is generated in situ, the overall net reaction is depicted by the following equation:

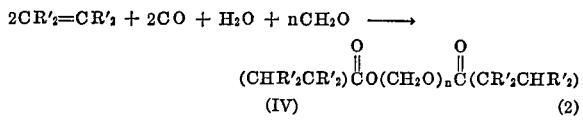

It is appreciated that one ($CHR'_2CR'_2$—) group of the product (IV) corresponds to the R group in Formula III. By way of illustration, the reaction of ethylene, CO, water and formaldehyde according to this modification of the process produces a product represented by the formula

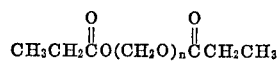

and the reaction of cyclohexene, CO, water and formaldehyde produces a product represented by the formula

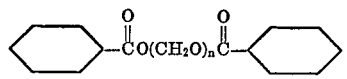

The process of the invention is also generally applicable to the reaction of other carbonyl compounds in addition to formaldehyde. For example, aldehydes and ketones such as chloral, benzaldehyde, acetaldehyde and acetone react in the process of the invention according to the following general Equation 3:

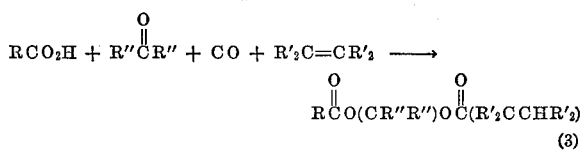
(3)

wherein

represents the aldehyde or ketone reactant. When acetaldehyde is employed, the reaction products are represented by the formula

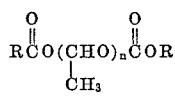

wherein R and $n$ have the same significance as defined above.

In the modification of the process wherein the carboxylic acid is generated in situ, the reaction proceeds according to Equation 4:

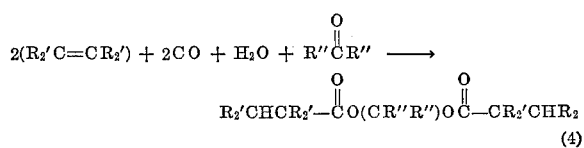
(4)

The reactant molar ratios

The reactants employed in the process of the invention are generally contacted in the molar ratios defined by the stoichiometry of Equation 1. That is, the molar ratio of alkanoic acid to olefin is substantially equimolar (e.g. 1.5:1 to 1:1.5) and the molar ratio of carbon monoxide to olefin is substantially equimolar. The amount of formaldehyde reactant depends in part upon the number of oxymethylene linkages ($CH_2O$) desired in the product. When a product comprising principally methylene bis-esters (wherein $n=1$) is desired, the molar ratio of formaldehyde to olefin is substantially equimolar (e.g., 1.5:1 to 1:1.5). When a product containing oxymethylene bis-esters (wherein $n>1$) is desired, the molar ratios of formaldehyde to olefin of from about 1:1.5 to 5:1 are employed. However, an excess of any reactant is suitably employed. For example, in some modifications of the process, it is desirable to employ excess olefin or alkanoic acid as reaction diluents. Accordingly, molar ratios of alkanoic acid to olefin of from 10:1 to 1:10, molar ratios of carbon monoxide to olefin of from 10:1 to 1:2 and molar ratios of formaldehyde to olefin of 5:1 to 1:5 are satisfactorily employed.

In the modification of the reaction wherein the alkanoic acid reactant is generated in situ from the olefin reactant, carbon monoxide and water, the molar ratio of water to olefin is generally about 2:1 to 1:4 although a molar ratio of about 1:2 (as required by the stoichiometry of Equation 2) is preferred. Suitable molar ratios of carbon monoxide to olefin are about 10:1 to 1:2, preferably 1.5:1 to 1:1.5 and suitable molar ratios of formaldehyde to olefin are 5:1 to 1:5, preferably 0.2:1 to 2:1.

Reaction conditions

The process of the invention is conducted in a fluid phase, i.e., either in the gaseous or liquid phase, in the presence or in the absence of an inert reaction diluent. Suitable inert normally-liquid diluents are hydrocarbons free from aliphatic unsaturation such as hexane, heptane, octane, decane, cyclohexane, benzene, toluene and xylene. Suitable normally-gaseous diluents are nitrogen, hydrogen, argon, helium, methane and ethane. As indicated above, in some modifications of the process, a portion of the olefin or carboxylic acid reactant suitably serves as the reaction diluent. When diluent is employed up to about 50 moles per mole of olefin reactant are satisfactory. The process is suitably conducted in an inert reaction environment so that the presence of reactive materials such as oxygen is desirably avoided.

The process of the invention is carried out by intimately contacting the olefin reactant, the carboxylic acid reactant, carbon monoxide and formaldehyde in the presence of the rhodium catalyst and the iodide promoter or, in the modifications wherein an alkanoic acid reactant is generated in situ, by intimately contacting the olefin reactant, carbon monoxide, formaldehyde and water (or alkanol) in the presence of the catalyst system. A variety of procedures can be employed for contacting the reaction components with the catalyst system. In one modification, the entire amounts of olefin reactant, carboxylic acid reactant, formaldehyde, carbon monoxide and catalyst components are charged to an autoclave or similar pressure reaction and maintained at reaction conditions for the desired reaction period. In another modification, one reaction component is added to the other reaction components in increments, as by adding the formaldehyde to a mixture of the other reaction components and catalyst system. In yet another modification an active catalyst system is initially preformed by contacting at elevated temperature the rhodium compound, carbon monoxide and iodide promoter in a suitable solvent and subsequently adding the remaining reaction components. In certain modifications wherein a supported catalyst system is employed, the reaction is effected in a continuous manner as by passing a mixture of the reaction components through a reactor in which the supported catalyst system is maintained.

In the modifications of the reaction wherein an alkanoic acid reactant is generated in situ, the reaction is suitably conducted by contacting the alkene, carbon monoxide and water (or alkanol) in the presence of the catalyst system and subsequently adding the formaldehyde reactant and, if desired, additional alkene and carbon monoxide reactants. Alternatively, it is also suitable to initially contact the entire amounts of reaction mixture components in the presence of the catalyst system.

The process of the invention is conducted at moderate temperatures and pressures. Suitable reaction temperatures varying from about 50° C. to 300° C. are satisfactory and reaction temperatures varying from about 125° C. to 225° C. are preferred. The process is conducted at or above atmospheric pressure, and pressures from about 1 atmosphere to about 100 atmospheres are satisfactory.

At the conclusion of the reaction, the product mixture is separated and the product is recovered by conventional means such as fractional distillation. Unreacted reaction components and intermediates, e.g., alkanoic acids, are suitably recycled for additional conversion.

EXAMPLE 1

Preparation of methylene bis-propionate from ethylene carbon monoxide, formaldehyde and propionic acid A 1-liter Hastelloy C magnetically stirred autoclave was charged with 1 mole of propionic acid, 1 mole of formaldehyde (as trioxane), 0.001 mole of

[$Rh(CO_2)Cl$]

dimer and 0.05 mole of ethyl iodide, and then flushed with nitrogen and carbon monoxide. Carbon monoxide (1.36 moles) and 1.2 moles of ethylene were then added to the autoclave. The total pressure at 25° C. was about 1000–1200 p.s.i.a.

The autoclave was maintained at 150° C. until the gas uptake stopped (5 hours). The autoclave was cooled to room temperature and vented. The product mixture was analyzed by infrared spectroscopic and gas chromatographic techniques. The conversion of ethylene was 37% and the yield of methylene bis-propionate

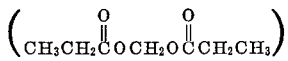

based on converted ethylene was 95.7%. A small amount of oxymethylene bis-propionate was found in the product mixture.

A repeat of Example 1 with paraformaldehyde as the formaldehyde source gave essentially identical results.

EXAMPLE 2

Preparation of methylene bis-propionate from ethylene carbon monoxide, and formaldehyde and water By a procedure similar to Example 1, a mixture of 0.4 mole of water, 1 mole of formaldehyde (as trioxane), 0.001 mole of [Rh(CO)$_2$Cl] dimer, 0.05 mole of ethyl iodide, 1.34 moles of ethylene and 1.34 moles of carbon monoxide was reacted in a stirred autoclave for 19 hours at 125° C. Analysis of the product mixture indicated an ethylene conversion of 38.7% and a 27% yield of propionic acid and an 88% yield of methylene bis-propionate based on converted ethylene.

We claim:

1. A process of producing methylene and oxymethylene di- or bis-alkanoic esters by reacting in liquid or gaseous phase (1) a carboxylic acid of the formula RCO$_2$H, wherein R is alkyl of 1 to 10 carbon atoms, (2) ethylene, (3) formaldehyde and (4) carbon monoxide in the presence of a catalytic amount of a rhodium compound and an iodide promoter, the molar ratio of carboxylic acid to ethylene being from about 10:1 to 1:10, the molar ratio of carbon monoxide to ethylene being from about 10:1 to 1:2, the molar ratio of formaldehyde to ethylene being from about 5:1 to 1:5, at a temperature of about 50° C. to 300° C. and at an initial carbon monoxide pressure of from 1 p.s.i.a. to 5000 p.s.i.a.

2. The process of claim 1 wherein the carboxylic acid is acetic acid.

3. The process of claim 1 wherein the carboxylic acid is an alkanoic acid of from 3 to 10 carbon atoms.

4. The process of claim 3 wherein the rhodium compound is a rhodium halide.

5. The process of claim 3 wherein the rhodium compound is a rhodium carbonyl halide.

6. The process of claim 3 wherein the carboxylic acid is propionic acid.

7. The process of claim 6 wherein the iodide promoter is iodine, hydrogen iodide or an alkyl iodide of 1 to 6 carbon atoms and 1 to 3 iodide groups.

8. The process of claim 6 wherein the formaldehyde is produced in situ from paraformaldehyde or trioxane.

9. A process of producing methylene bis-propionate by reacting ethylene, formaldehyde, water and carbon monoxide in the presence of a catalytic amount of a rhodium compound and an iodide promoter, the molar ratio of formaldehyde to ethylene being about 0.2:1 to 2:1, the molar ratio of water to ethylene being about 1:2 and the molar ratio of carbon monoxide to ethylene being about 10:1 to 1:2, at a temperature of from about 125° C. to 225° C. and at a carbon monoxide partial pressure of from about 25 p.s.i.a. to 1000 p.s.i.a.

10. The process of claim 9 wherein the iodide promoter is iodine, hydrogen iodide or an alkyl iodide of 1 to 6 carbon atoms and 1 to 3 iodide groups.

11. The process of claim 9 wherein the rhodium compound is a rhodium halide or a rhodium carbonyl halide.

12. The process of claim 9 wherein the formaldehyde is produced in situ from paraformaldehyde or trioxane.

References Cited

UNITED STATES PATENTS 3,081,357   3/1963   Alderson et al. _____ 260—494
3,579,552   5/1971   Craddock et al. _____ 260—413

FOREIGN PATENTS 837,640   3/1970   Canada _____ 260—491

VIVIAN GARNER, Primary Examiner

U.S. Cl. X.R.

260—295 R, 332.2 A, 347.5, 410.6, 413, 468 CB, 469, 475 N, 476 R, 485 G, 533 A